May 7, 1963 C. W. TUDOR 3,088,227

COLOR HARMONY CHART

Filed March 24, 1961

INVENTOR.
CHARLES TUDOR

BY

Brumbaugh, Free, Graves & Donohue his ATTORNEYS

United States Patent Office 3,088,227

Patented May 7, 1963

3,088,227
COLOR HARMONY CHART

Charles W. Tudor, New York, N.Y., assignor to Tudor Color Corporation, New York, N.Y., a corporation of New York Filed Mar. 24, 1961, Ser. No. 98,246
6 Claims. (Cl. 35—28.5)

This invention relates to a color harmony chart by which a large number of different hues may be obtained and indexed or identified. This invention further relates to a translucent chart by which, at any one time, a large number of colors may be presented which are in direct color balance or in harmony with each other, which chart at the same time presents the complementary color for each of the colors in balance. Further, the present invention provides a chart by which the brightness and saturation of the different hues may be varied at will.

For the purpose of the present application "complementary colors" shall be defined as those colors which would spin to grey on a color wheel. Hue shall be defined as the amount of yellow, red or blue imparted to a color. Saturation (or tone) shall be defined as the amount of pigment per unit area, whereas brightness (or darkness) is the amount of white content or black content contained in any color. By the present invention, any color sought can be defined by its hue content, (degree of saturation of red, yellow and blue) on the one hand, and its white content or black content on the other hand.

It is known to organize colors on a chart to avoid the sensation of color disharmony or discord. Extensive research was done in this respect by Dr Wilhelm Ostwald, a well known German chemist, psychologist and philosopher during the period between 1916 and 1931. One system developed and based on his work provides a number of color hues arranged in a circular manner on a chart. For each hue shown, an additional chart is provided presenting the hue modified by white or black content, thereby obtaining not only a large number of different hues, but hues of varying brightness and saturation. In the first mentioned chart the full colors yellow, red, blue and green may be provided and various hue steps between the full colors. Complementary hues are obtained by arranging the chart so that for each hue, the complementary hue appears directly across from it.

A principal objection to the above system is that it is very costly to reproduce. Also, it is limited for a number of reasons in the number of hues that can be produced.

The present invention is also based on the Ostwald system providing an organization of colors arranged to avoid disharmony and an organization of their complementary colors, in the form of a chart by which any color and its complementary color may readily be identified.

Essentially, the color harmony chart comprises three transparent or translucent discs, one containing an organization of pure yellow colors, another containing an organization of pure red colors, and the last containing an organization of pure blue colors. On each disc, the organization comprises at least two monochromatic color bands divided into equal segments, each of the segments representing a color gradation for the color hue, and the segments ranging from zero tone (no color) to full color or maximum saturation. A gradation of zero tone, in this instance, is synonomous with maximum brightness, since the transparent segments wil transmit maximum light or give maximum white content. The gradations from no color (maximum brightness) to maximum saturation and full color are equal, i.e., the progression or increases in pigment content from one segment to the next are constant, and are identified by suitable index numerals.

The color hues are selected so that when the discs are superimposed one upon another, the full colors and their gradations will produce a neutral grey scale from full white to black. The three colors must be in perfect color balance to accomplish this and are the three colors commonly used in multi-color film or multi-color printing.

A fourth disc is provided having grey achromatic bands ranging from full white to black. This disc may be superimposed upon the other three color discs at will to impart white or black content to the hues produced by the three other discs.

The two color bands (or achromatic bands) for each disc are arranged so that they are adjacent to each other or concentric if the disc is circular in shape, and so that the bands extend in opposite directions with respect to each other. For instance, with respect to a circular disc, the gradations from no saturation to full saturation may extend in a clockwise direction for the outer band. Further, the bands are arranged so that the segment of 0% saturation for one will be adjacent to the segment of maximum saturation for the other. The arrangement is such that when the three (or four) discs are superimposed, for every color hue produced in the first band, the complementary thereof will be produced in the second band.

The device is constructed so that all colors and all color harmony combinations will be identifiable by a series of code numbers which have been in common use by the printing trade for years. These code numbers will permit an easy and precise means of universal color identification.

Other features and advantages of the invention will become apparent upon further consideration of the following specification and drawings, in which.

Figure 1:
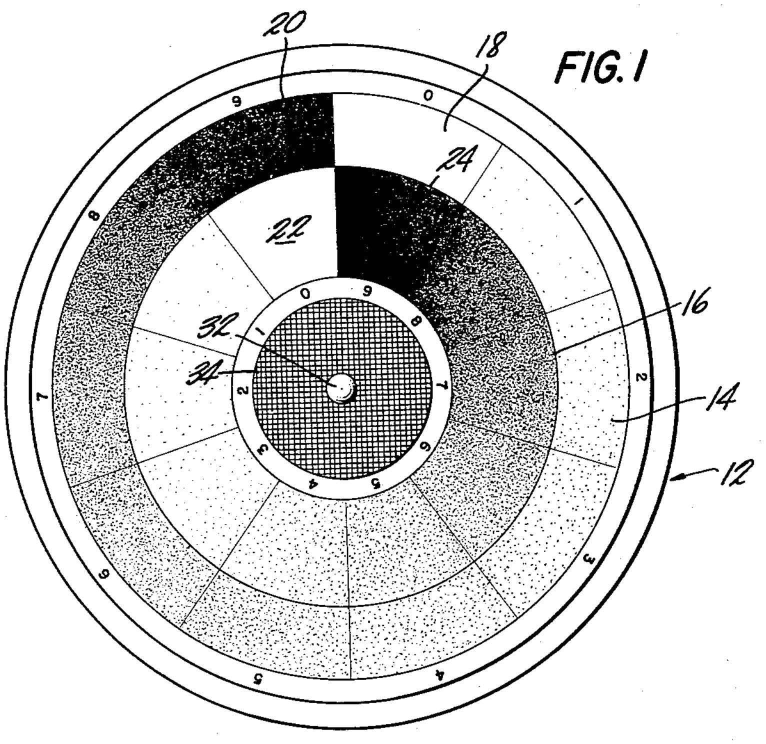
FIGURE 1 illustrates a plan view of a translucent disc embodying the concepts of the invention.

Referring to FIGURE 1, there is illustrated a component of the color harmony chart, a transparent color disc 12 which may have concentric monochromatic bands 14 and 16 of either pure yellow, pure red, or pure blue. Specifically, the disc is provided with a first outer, annular monochromatic color band 14 extending in a clockwise direction and divided into segments or color gradations for the color proceeding from no color (segment 18 of maximum brightness) to full color (segment 20 of maximum saturation). The segments have equal dimensions, and the color gradations or steps from no color to full color are equal. In other words, the increases in hue content from segment to segment are equal, each segment having a slightly greater hue content for the color than the segment preceding it. The number of segments are 10, but this may be increased or diminished according to the subtlety of the final colors desired. The segments or tones may be designated by the numerals 0–9 positioned radially on the discs, or in any other suitable manner.

In addition to the first color band, the disc is provided with a second, annular, monochromatic, color band 16 of the same color concentric with but nearer to the center of the disc than the outer band 14, the segments or tones of which are also identifiable by the numerals 0–9. The second color band is also provided with the same color gradations, proceeding from no color (segment 22 of maximum brightness) to full color (segment 24 of maximum saturation), but in the reverse or counterclockwise direction. The arrangement is also such that tone 9 (segment 24 of maximum saturation) for the inner band is located directly adjacent to the tone zero (segment 18 of maximum brightness) for the outer band.

Color harmony is based on hue content, both in terms of black and white content, and of color. By placing tone 9 of one band adjacent to tone 0 of the other band the ultimate contrast for that color is obtained, and the mixture of these two will produce a neutral tone of medium saturation. All of the radially adjacent tones of the inner and outer bands, if added, add to a saturation of 9, and the disc, if rotated rapidly, will produce the above-mentioned neutral tone of medium saturation.

It will become apparent that this arrangement for each color disc or component provides for the color harmony chart the contrast range necessary for the color harmony qualifications of the device.

Figure 2:
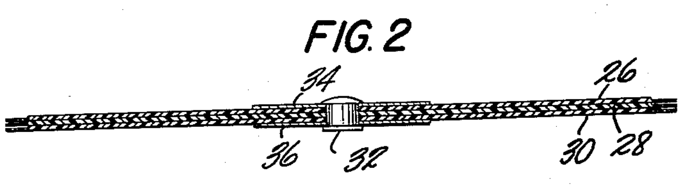
FIGURE 2 is a sectional view of a color harmony chart according to the invention.

The color harmony chart, illustrated in FIGURE 2, is comprised of three of the discs of FIGURE 1 superimposed one upon another as described, each disc being monochromatic. For instance, the colors of one disc will be pure yellow, varying only with respect to saturation in the manner described, those of the other discs being red and blue respectively, also varying only with respect to saturation in the manner described.

A fourth achromatic disc is provided having segments corresponding to the segments of the other three color discs, i.e., of the same dimensions and degrees of saturation, the color gradations, however, being from black to white. In this disc, the tone 9 of maximum saturation is black, the tone 0 being white or of maximum brightness. A mixture of tone 0 and tone 9 provides a neutral grey, as does rapidly rotating the disc.

Referring to FIGURE 2, there is illustrated the three monochromatic yellow, red and blue discs superimposed one over another. For the purpose of illustration, the upper disc 26 shall be described as showing hues of yellow of varying saturation, the middle and lower discs 28 and 30, respectively, showing hues of red, and hues of blue, in that order, and of varying saturation.

It is contemplated that the color harmony chart be viewed over a suitable light source, so that the light reaching the eye is transmitted light only, i.e., light viewed through the chart (as compared to light reflected by the chart). In this way, the particular sequence or relationship of the discs will not affect the color sensation obtained. In other words, the yellow disc may overlie the red and blue discs, or vice versa, or any other sequence may be used.

The three discs are joined together at their centers by a pin 32, or like means, permitting the discs to be rotated relative to each other. Other discs 34 and 36 of lesser diameter, preferably black and non-transparent, may be provided as reference colors for the viewer.

Of importance, is the requirement that each of the discs be identical, except with respect to color, so that they may be properly rotated, and oriented to have the corresponding segments of each in alignment. In other words, segments 0–9 of the yellow disc 26 should be capable of exact alignment with the segments 0–9 of the red and blue discs 28 and 30, respectively, and so forth.

Of further importance, is the requirement that the yellow, red and blue color hues be selected so that when the discs are superimposed as above, i.e., with the segments aligned so that the tonal gradations of each overlie the same tonal gradations of the others, the inner and outer bands shall be seen as neutral grey bands ranging from clear white, or a hue of no saturation, to black or a hue of maximum saturation.

When the three monochromatic discs are so superimposed, and placed over a suitable light source, it is apparent that, first, any of the three monochromatic color hues at any gradation from no color to maximum saturation may be obtained; and by suitable adjustment of the individual discs, by which the yellow bands may be made redder or bluer, the red bands yellower or bluer, and the blue bands redder or yellower, any combination of mixtures of yellow, red and blue, of any content of each, may be obtained. Finally, at any particular setting, all of the colors shown will be in harmony, and complementary colors having maximum contrast and colors of lesser contrast for each hue selected will at the same time be shown.

As an example, to obtain a pure yellow color, the lower discs 28 and 30 (FIGURE 2) are adjusted to be in alignment so that the segments of maximum brightness (zero tone) exactly overlie. Then by rotating the upper disc 26 (FIGURE 2) yellow of any degree of saturation overlying the above aligned segments of zero tone, and its complementary color overlying the radially adjacent tones of maximum saturation, may be obtained. Specifically, if in the outer band, tone 9 is used to show full yellow, the complementary color will be shown in the inner band in the radially adjacent segment, and for a yellow of maximum saturation, the complementary will be a deep purple, obtained from an equal content of blue and red of maximum saturation and a yellow content of zero.

Rotating the disc 26 so that a yellow segment of tone 5 (of intermediate saturation) overlies the aligned segments of zero tone of the discs 28 and 30 produces a complementary color in the radially adjacent segment of the inner band which has a maximum blue and red content and a yellow content of 4. The result is the purple of the above example modified by the yellow content. If the yellow content were of maximum saturation a neutral grey would have been produced. As it was the complementary color was an off-purple.

At this setting of the discs 26, 28 and 30, other colors ranging from the yellow segment 5 through several browns to a purple having a blue and red content of 9 and a yellow content of 4 will be obtained in the outer band, and for each color or hue, its complementary will be located radially adjacent to it in the inner band. At this setting twenty colors are visible all in perfect harmony so that any of the colors can be used with any other color, and half will be complementary to the other, adjacent half.

By shifting all three discs slightly relative to each other, thirty (30) or more colors can be seen at any one time, and, at each setting, the complementary of any color can be obtained and, again, every color viewed will be in perfect color harmony with every other color.

Altogether, by the arrangement described, more than 10,000 different colors including complementaries, split complementaries, triads, intermediates, alternates, adjoining colors, each with its complicated variation of the three primary colors, can be obtained by suitably adjusting the three discs radially to each other.

Figure 3:
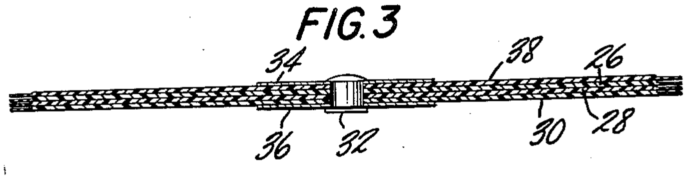
FIGURE 3 illustrates the use of a fourth achromatic disc with the arrangement illustrated in FIGURE 2.

If to these three primary color discs, a black and white color disc is added, designated by the numeral 38, FIGURE 3, which is identical in design to the others, any degree of lightness or darkness for any of the color combinations may be obtained. This is accomplished by rotating the disc 38 relative to the others to vary the brightness of the colors or to "grey" the colors, and again, the complementary of the colors sought will be in the radially adjacent segments of the other band.

The color discs may be manufactured by exposing black and white film through a graduated number (0 to 9) of light sources, producing the graduated wedge-like segments, pie-like in shape, which become ten, equal, visual steps from 0 saturation to maximum saturation. The film is then cut into the two concentric circles or bands with the center of each at the intersection of the pie-shaped wedges and the inner band is then reversed on itself and positioned within the larger outer band, the segment of maximum saturation of one band being radially adjacent to the segment of zero saturation of the other band. This circular film pattern then becomes a master negative from which multiple similar black and white charts may be printed on film. These films are then dye-coupled with the three so-called primary colors, yellow, red and blue. Dye-coupling consists of replacing the black and white images on the film with tone images of the primary colors. The three additions of yellow, red and blue are balanced one against the other so that when superimposed the resultant color is a neutral grey.

The black and white achromatic disc is identical in design to the above, except that the indicia may be different, but it is provided with the same mathematical color contrast to provide a uniform, neutral saturation range.

Instead of using superimposed circular discs as illustrated, the colors may be superimposed in a slide rule type of device, or may be arranged in any other manner embodying the principles outlined.

Other modifications will be apparent to those skilled in the art, and it is intended that the invention be limited only as defined by the following claims.

What is claimed:

1. A color chart including at least three superimposed transparent elements movable with respect to each other, each element having at least two monochromatic color bands having color gradations ranging in corresponding steps from maximum brilliance to maximum saturation in opposite directions with respect to the relative motion of the elements, the corresponding bands on the elements being in overlying relation, said bands and elements being arranged so that for any color viewed by transmitted light in a gradation of one band the complementary of that color is viewed in the adjacent gradation of another band, said colors of said different elements being selected so that when colors of equal tone are superimposed the resultant color is a neutral grey.

2. A color chart comprising at least three superimposed transparent elements movable with respect to each other, each element having at least two adjacent monochromatic color bands having color segments of equal dimensions ranging in corresponding steps from no color to full color in opposite directions with respect to the relative motion of the elements, the corresponding bands on the elements being in overlying relation, said color bands being arranged so that the color tone of each segment of one of said bands has adjacent to it in another of said bands a contrasting tone, which adjacent tones if superimposed would add up to a neutral tone of maximum saturation, said colors of said different elements being selected so that when gradations of the same tone are superimposed the resultant color is a neutral grey.

3. A color chart comprising at least three superimposed transparent discs rotatable with respect to each other, each disc having at least two circular and concentric monochromatic color bands having color segments of equal dimensions ranging in equal steps from no color to full color in opposite directions with respect to the relative motion of the discs, the corresponding bands on the discs being in overlying relation, said color bands being arranged so that the color tone of each segment of one of said bands has radially adjacent to it in another of said bands a contrasting tone, which adjacent tones if superimposed would add up to a neutral tone of maximum saturation, said discs being arranged so that each of the segments of one may be aligned with segments of the same tone of the others, said colors of said different discs being selected so that when gradations of the same tone are superimposed the resulting color is a neutral grey.

4. A color chart comprising three superimposed transparent discs rotatable with respect to each other, each disc having two circular and concentric monochromatic color bands having color segments of equal dimensions ranging in equal steps from no color to full color in clockwise and counterclockwise directions respectively, the bands being radially offset so that the segment of no color of one of said bands has radially adjacent to it a segment of full color in the other of said bands, the corresponding bands in the discs being in overlying relation, said bands further being arranged so that the color tone of each segment of one of said bands has radially adjacent to it in the other of said bands a contrasting tone, which adjacent tones if superimposed would all add up to a neutral tone of maximum saturation, the colors of said different discs being yellow, red and blue hues selected so that when gradations of the same tone are superimposed the resultant color is a neutral grey.

5. A color chart comprising four superimposed transparent discs, rotatable with respect to each other, three of said discs each having two circular and concentric monochromatic color bands having color segments of equal dimensions and ranging in equal steps from no color to full color in clockwise and counter clockwise directions respectively, said fourth disc having two corresponding circular achromatic color bands having segments of equal dimensions and ranging in equal steps from white to black in clockwise and counter clockwise directions respectively, the corresponding bands in all the discs being in overlying relation, said color bands being arranged relative to each other so that in one disc the color tone of each segment of one of said bands has radially adjacent to it in the other of said bands a contrasting tone, the adjacent contrasting tones if superimposed all adding up to the same neutral tone of maximum saturation, said colors of said first mentioned three monochromatic discs being selected so that when gradations of the same tone are superimposed the resultant color is a neutral grey.

6. A color chart comprising at least three superimposed transparent discs, each disc having two concentric circular oppositely extending monochromatic color bands having color segments of equal dimensions ranging in equal steps from no color to full color in clockwise and counter clockwise directions respectively, the corresponding bands in all the discs being in overlying relation, said color bands being arranged so that the segment of no color of one of said bands is adjacent to the segment of full color of the other of said bands, and being further arranged so that the color tone of each segment of one of said bands has adjacent to it in the other of said bands a contrasting tone, such that all of the adjacent tones when superimposed add up to the same neutral tone of maximum saturation, said colors of said different discs being selected so that when gradations of the same tone are superimposed the resultant color is a neutral grey.

References Cited in the file of this patent

UNITED STATES PATENTS

| | | |
|---|---|---|
| 624,331 | Henderson | May 2, 1899 |
| 862,336 | Kallab | Aug. 6, 1907 |
| 924,322 | Crosby | June 8, 1909 |
| 2,253,107 | Brooks | Aug. 19, 1941 |